United States Patent [19]
Boyer et al.

[11] Patent Number: 5,573,284
[45] Date of Patent: Nov. 12, 1996

[54] EXPANSION JOINT FOR HOT PIPES

[75] Inventors: Claude Boyer, L'Hay les Roses; Dominique Nolleau, Paris, both of France

[73] Assignee: GEC Alsthom Stein Industrie, Velizy-Villacoublay, France

[21] Appl. No.: 527,728

[22] Filed: Sep. 13, 1995

[30] Foreign Application Priority Data

Sep. 14, 1994 [FR] France .................................. 94 10973

[51] Int. Cl.$^6$ .................................................. F16L 27/02
[52] U.S. Cl. ............................ 285/298; 285/47; 285/187; 285/299; 285/226
[58] Field of Search ............................ 285/49, 298, 299, 285/300, 301, 187, 226, 227

[56] References Cited

U.S. PATENT DOCUMENTS

| | | | |
|---|---|---|---|
| 1,475,289 | 11/1923 | Diescher | 285/299 |
| 1,914,741 | 6/1933 | Gysling | 285/299 |
| 2,771,311 | 11/1956 | Hottenroth, Jr. | 285/299 |
| 3,369,829 | 2/1968 | Hopkins | 285/299 |
| 3,871,689 | 3/1975 | Zadrei et al. | |
| 4,046,407 | 9/1977 | Porreco | 285/299 |
| 5,299,841 | 4/1994 | Schaefer | 285/299 |

FOREIGN PATENT DOCUMENTS

| | | |
|---|---|---|
| 658066 | 5/1929 | France . |
| 503945 | 4/1971 | Switzerland . |

OTHER PUBLICATIONS

*Patent Abstracts of Japan,* vol. 16, No. 494 (M–1324), 13 Oct. 1992 & JP–A–04 181088 (Toukiyou Rasenkan Seisakushiyo KK) 29 Jun. 1992.

*Primary Examiner*—Eric K. Nicholson
*Attorney, Agent, or Firm*—Sughrue, Mion, Zinn, Macpeak & Seas

[57] ABSTRACT

An expansion joint connecting the ends of two pipes adapted to convey a hot fluid, each end having an end flange, includes a sleeve fastened at its respective edges to a cold flange fastened to a nesting device and a coupling arrangement connecting the end flange and the corresponding cold flange. The coupling arrangement comprises at least two members connected together, one fastened to the cold flange and the other fastened to the end flange. A first member is a corrugated sheetmetal sleeve the undulations of which are parallel to the longitudinal direction of the pipe and a second member is flexible and deformable in the longitudinal direction of the pipe.

5 Claims, 1 Drawing Sheet

EXPANSION JOINT FOR HOT PIPES

BACKGROUND OF THE INVENTION

1. Field of the Invention

The present invention concerns an expansion joint for hot pipes.

It is more particularly concerned with an expansion joint connecting the ends of two pipes adapted to convey a hot fluid, each end having an end flange, the joint including a sleeve comprising a flexible strip straddling the two adjacent ends and attached at its respective edges to a cold flange attached to a nesting device in a retaining arrangement fastened to the corresponding pipe and also including a coupling arrangement coupling the end flange and the corresponding cold flange.

2. Description of the prior art

In a prior art expansion joint of this kind the coupling arrangement is a sleeve fabricated from flat sheetmetal. Because it can flex, the sheetmetal absorbs some thermal deformation due to the temperature difference between the end flange that is hot and the cold flange and to expansion of the pipes themselves. An arrangement of this kind generates high stresses localized in the corners of the flanges and is somewhat unreliable in the case of large pipes conveying fluids at very high temperature.

Expansion joints of this type are required for inlet pipes of heat recovery boilers coupled to the exhaust of a gas turbine, for example, in which application the hot end flange is at a temperature in the order of 600° C. and the cold flange is at a temperature in the order of 200° C., with the result that the differential expansion is considerable. Also, these pipes usually have a large square cross-section, with a side length that can be in the order of 7.5 meters.

SUMMARY OF THE INVENTION

To solve the technical problems and to provide an expansion joint suitable for an application of this kind, in accordance with the invention the coupling arrangement comprises at least two members connected together, one fastened to the cold flange and the other fastened to the end flange, the first member being a corrugated metal sheet sleeve the undulations of which are parallel to the longitudinal direction of the pipe and the second member being flexible and deformable in the longitudinal direction of the pipe.

In a preferred embodiment of the invention the second member is a curved flexible plate the curvature of which is perpendicular to the undulations of the sleeve.

The coupling arrangement advantageously comprises two second members of which one member is fastened to the cold flange and the other member is fastened to the end flange, said two members being joined together by a first intermediate member.

The invention further consists in a pipe for conveying hot gas from the exhaust of a gas turbine into a heat recovery boiler wherein it comprises pipe sections joined by an expansion joint as defined hereinabove.

The invention is described in more detail hereinafter with the aid of figures showing a preferred embodiment of the invention.

DETAILED DESCRIPTION OF THE PREFERRED EMBODIMENT

Figure 1:
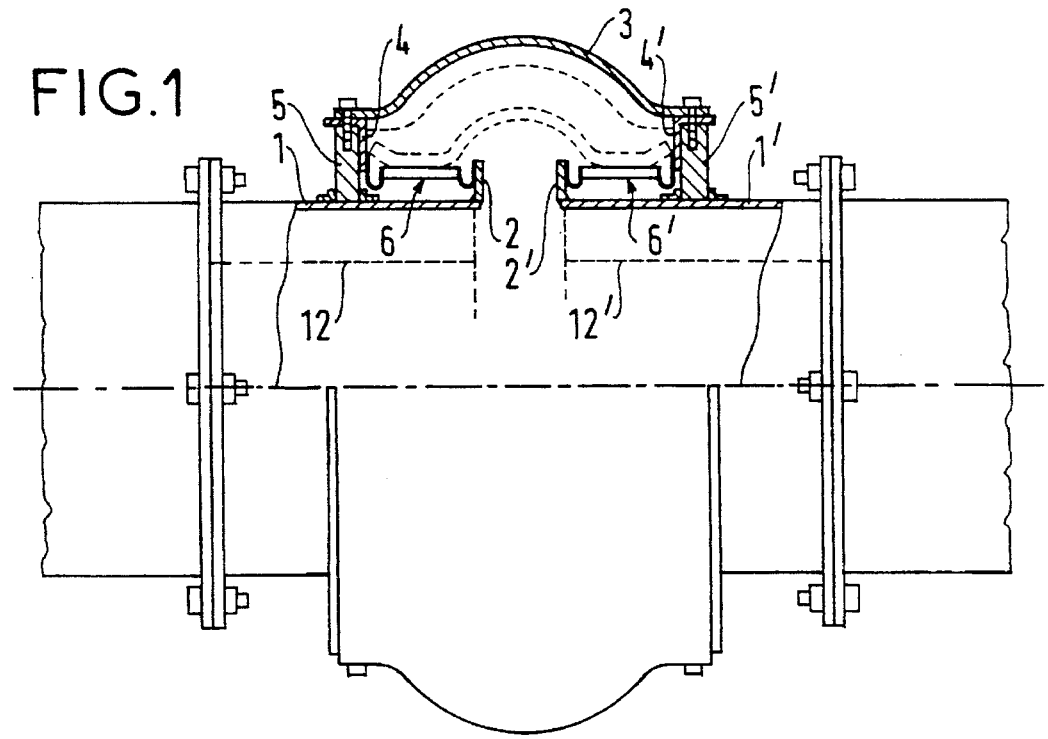
FIG. 1 is a part-sectional front view of an expansion joint of the invention.

As shown in FIG. 1, the expansion joint connects the ends of two pipes 1, 1' adapted to convey a hot fluid and preferably square in cross-section. Each end has an end flange 2, 2', preferably welded to the respective pipe end. The joint includes a sleeve 3 comprising a flexible strip straddling the two adjacent ends and attached at its respective edges to a cold flange 4, 4' fastened to a nesting device in a retaining arrangement fastened to the corresponding pipe. The strip 3 may be made up of layers of ceramic and PTFE.

The joint further includes a coupling arrangement 6, 6' coupling the end flange 2, 2' and the corresponding cold flange 4, 4'.

In a manner that is known in itself, the pipes 1 and 1' are thermally insulated by a layer 12, 12' of insulative material disposed on the outside or on the inside of the pipes 1, 1' and layers 13 of insulative material are also disposed inside the joint.

All these components will be described in more detail with reference to FIG. 2.

The coupling arrangement 6, 6' must absorb thermal deformations due to the temperature difference between the end flange 2, 2' which is hot, because it is exposed to the temperature of the hot fluid conveyed in the pipes 1, 1', and the cold flange 4, 4'.

Figure 2:
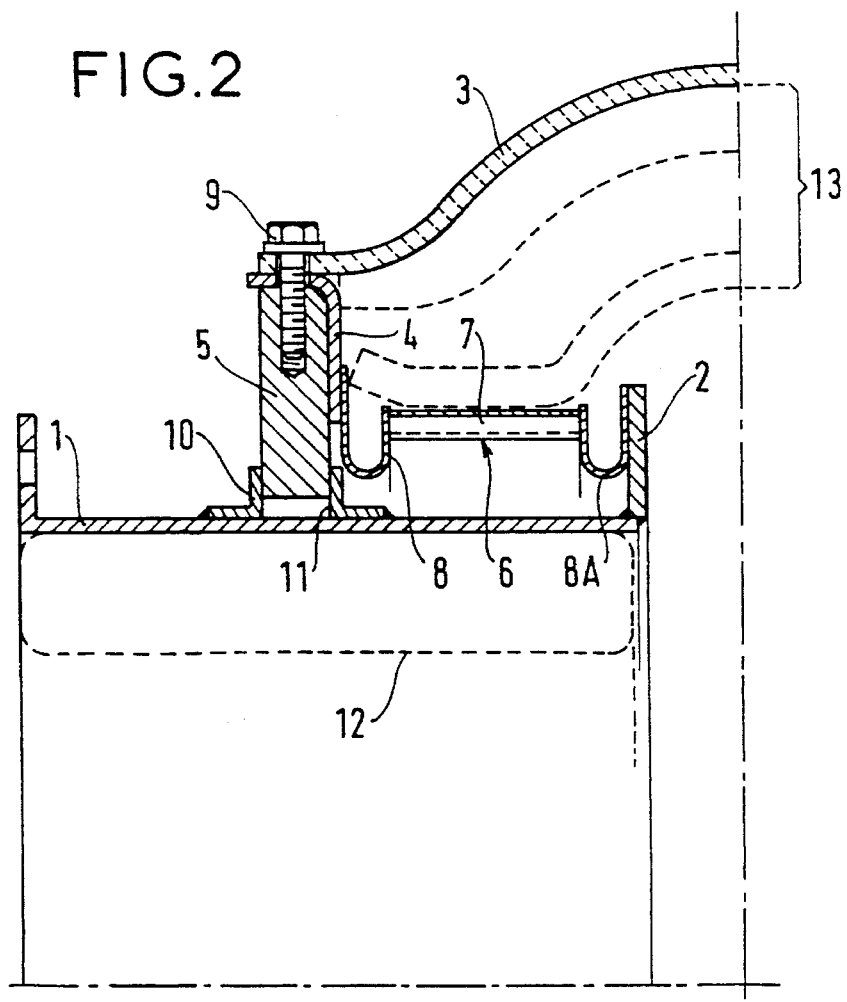
FIG. 2 is a half-view in longitudinal section of the same joint.

In accordance with the invention, as can be seen more clearly in FIG. 2, this coupling arrangement 6 comprises at least two members, referred to herein as the first and second members, one fastened to the cold flange 4 and the other fastened to the end flange 2, the first member 7 being deformable in the tangential direction and the second member 8 being flexible and deformable in the longitudinal direction of the pipe.

In this preferred embodiment the strip 3 is fastened to the cold flange 4 by screws 9. The nesting arrangement 5 comprising a ring or ring sections is attached (preferably welded) to the cold flange 4 and is nested between two profiled members 10, 11 welded to the pipe 1. This nesting arrangement and the associated retaining arrangement can be implemented differently without departing from the scope of the invention; for example, in an alternative embodiment that is not shown, the retaining arrangement could be a peripheral flange fastened to the pipe and the nesting arrangement could be a groove receiving this flange.

The tangentially deformable first member is a corrugated sheetmetal sleeve 7, the undulations being parallel to the longitudinal direction of the pipe 1. The second member is a curved flexible plate 8, 8A the curvature of which is perpendicular to the undulations of the first member 7. The coupling arrangement 6 comprises two second members 8 and 8A, one member 8 fastened to the cold flange 4 and the other member 8A fastened to the end flange 2, these two members being joined together by a first intermediate member 7. All these members are made of metal, preferably stainless steel.

The corrugated sheetmetal sleeve 7 deforms when the cross-section of the pipe varies due to expansion and absorbs differential expansion in the tangential direction, the undulations enabling it to deform tangentially. The deformations can be of differing sizes from one side to the other of the sleeve 7, in which case the latter assumes a fan shape.

The flexible plates 8, 8A absorb differential expansion in the longitudinal direction by virtue of their curvature and flexing resulting from displacement of the pipe by virtue of their flexibility.

In the embodiment shown the coupling arrangement 6 comprises two second members 8, 8A joined together by a first intermediate member 7. In accordance with the invention, however, to fulfil its function it is sufficient for the coupling arrangement 6 to comprise a first member 7 and a single second member 8 or 8A.

An expansion joint of this kind is intended in particular to be fitted to a pipe conveying hot gas from the exhaust of a gas turbine into a heat recover boiler, the various pipe sections being joined together by means of this expansion joint.

There is claimed:

1. Expansion joint for connecting the ends of two pipes adapted to convey a hot fluid, each end having an end flange, the joint including a sleeve made up of a flexible strip straddling the two adjacent ends and fastened at its respective edges to a cold flange fastened to a nesting device in a retaining arrangement fastened to the corresponding pipe and further including a coupling arrangement connecting said end flange and the corresponding cold flange, wherein said coupling arrangement comprises at least two members connected together, one fastened to said cold flange and the other fastened to said end flange, a first member being a corrugated sheetmetal sleeve the undulations of which are parallel to the longitudinal direction of said pipe and a second member being flexible and deformable in the longitudinal direction of said pipe.

2. Expansion joint according to claim 1 wherein said second member is a curved flexible plate the curvature of which is perpendicular to the undulations of said sleeve.

3. Expansion joint according to claim 1 wherein said coupling arrangement comprises two second members of which one is fastened to said cold flange and the other is fastened to said end flange, said two members being joined together by a first intermediate member.

4. Expansion joint according to claim 1 wherein said first and second members are made of stainless steel.

5. Pipe for conveying hot gas from the exhaust of a gas turbine into a heat recovery boiler, said pipe comprising pipe sections joined by an expansion joint according to claim 1.

* * * * *